United States Patent [19]

Vanus et al.

[11] 4,146,989
[45] Apr. 3, 1979

[54] BAIT TANK

[75] Inventors: Anthony M. Vanus, Alta Loma; Jerome W. Vanus, Ontario, both of Calif.

[73] Assignee: Sport Fishing Fineries, Inc., Costa Mesa, Calif.

[21] Appl. No.: 800,350

[22] Filed: May 25, 1977

[51] Int. Cl.² ............................................. A01K 97/04
[52] U.S. Cl. .......................................... 43/55; 43/57
[58] Field of Search .................. 43/55, 56, 57; 119/5; 9/1.7, 7; 114/69, 270

[56] References Cited

U.S. PATENT DOCUMENTS

| | | | |
|---|---|---|---|
| 980,956 | 1/1911 | Hulbert | 43/55 |
| 1,389,132 | 8/1921 | Galavan | 119/5 |
| 2,761,239 | 9/1956 | Stamps | 43/56 |
| 2,767,509 | 10/1956 | Breithaupt | 43/57 |
| 2,923,087 | 2/1960 | Cummings | 43/55 |
| 3,316,882 | 5/1967 | Renwick | 119/5 |
| 3,510,978 | 5/1970 | Murdock | 43/56 X |

FOREIGN PATENT DOCUMENTS 582277 9/1959 Canada ........................................ 43/57

Primary Examiner—Nicholas P. Godici
Attorney, Agent, or Firm—Boniard I. Brown

[57] ABSTRACT

A bait tank adapted to supply a continuous flow of water through a storage tank having live fish stored therein, said fish being used as fishing bait, wherein the tank is formed having a cylindrical wall defining a storage compartment for unobstructed water circulation therein, an angular channel being vertically formed in the annular wall with inlet openings spaced vertically therein to introduce water in a direction generally parallel to the circular inner side of the tank. Oppositely disposed to the inlet channel is an outlet system including an adjustable gate valve to control the height of the water within the tank, and including a drain gate to allow the tank to be emptied. Inlet and outlet passages are arranged to communicate with the tank compartment, and are located outside thereof and positioned adjacent the inlet and the outlet systems respectively, the tank being covered with an outer housing having an anti-slosh-lip arrangement formed at the opening thereof, wherein a light fixture is positioned to illuminate the storage compartment.

15 Claims, 10 Drawing Figures

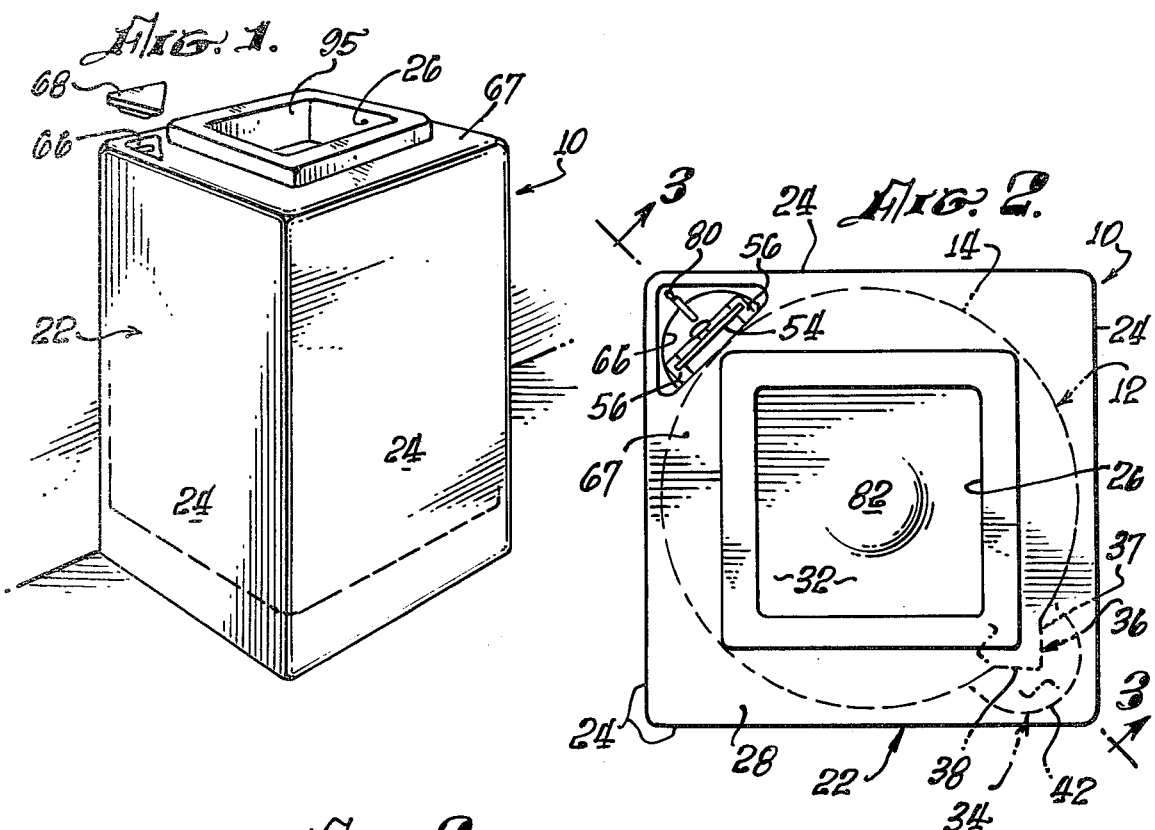
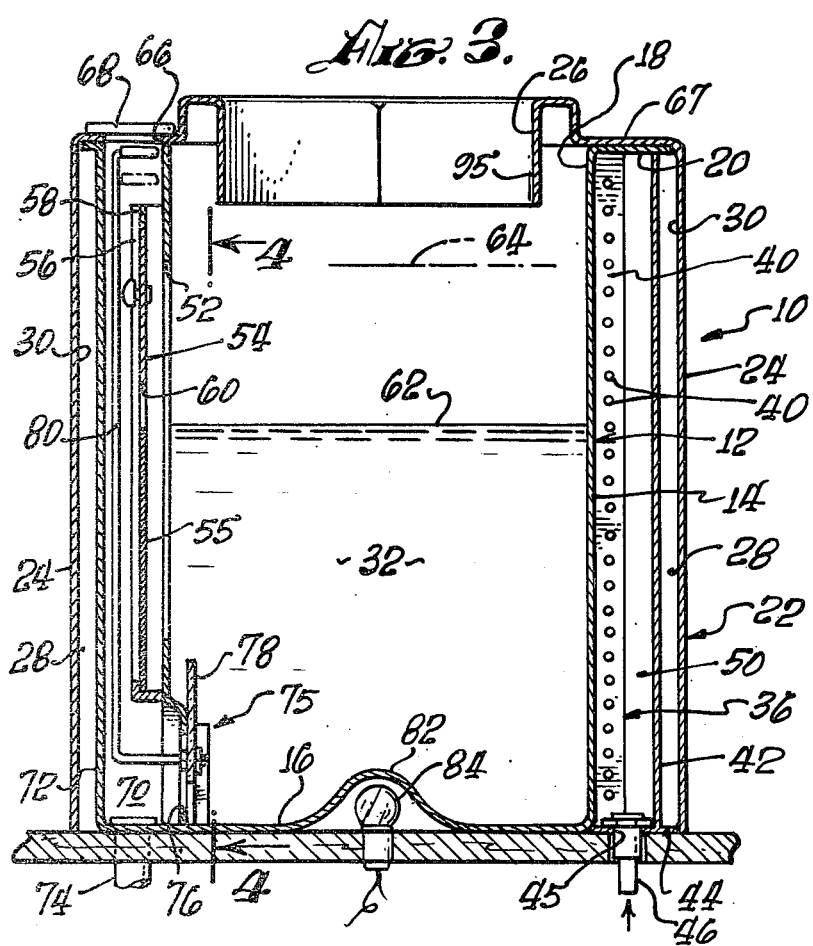

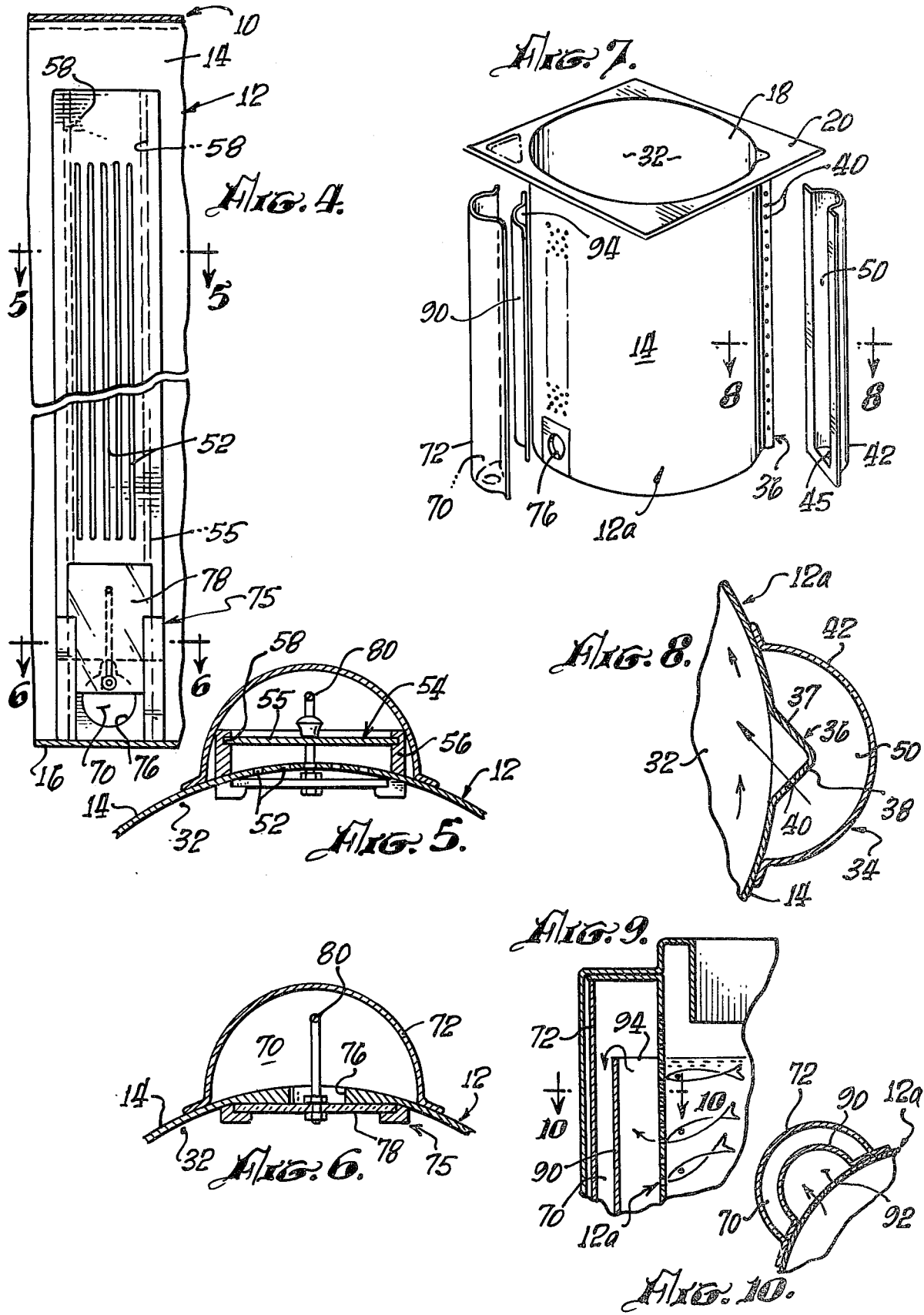

BAIT TANK

BACKGROUND OF THE INVENTION

1. Field of the Invention

This invention relates to the storage of live fish and, more particularly, to a bait tank, wherein a continuous stream of water is allowed to flow therethrough under controlled conditions.

2. Description of the Prior Art

As is well known in the art, various problems and difficulties are encountered in providing suitable means for storing live fish aboard boats and the like, wherein injury to the fish is avoided. Many live bait apparatuses do not provide means to continuously circulate water through the tank compartment; and others do not provide means for regulating the height or amount of water stored within a tank for a given number of fish.

Further, other tanks are so designed as to include openings or elements within the tank that cause injury to the fish and shorten their life. Thus, on long fishing trips, it sometimes happens that many of the fish to be used as live bait are found dead and become useless for particular types of fishing.

SUMMARY OF THE INVENTION

The present invention comprises a bait tank wherein live fish can be stored for considerable lengths of time under various extreme conditions, particularly when the bait tank is used aboard a boat that is on a long fishing trip. The bait tank comprises an inner storage tank having a storage compartment defined by an annular wall having a vertical inlet channel member adapted with a plurality of inlet openings, to allow the water to flow from an inlet passage outside the compartment to inside the compartment in a circular action, so as to allow the stream to be discharged through an outlet system arranged oppositely thereto. The outlet system comprises apertures in the annular wall having an adjustable gate valve positioned adjacent thereto, to control the height of the water in the tank compartment. Positioned below the gate valve is a drain gate to allow all the water to be discharged when necessary. Thus, an outlet passage is located outside the tank, and in alignment with the gate valve and the drain gate, wherein both gates along with the tank are covered by a housing affixed to the tank, the housing including an anti-slosh lip formed about the opening of the tank to prevent water spill.

To prevent water from entering the space between the tank and the cover housing, the inlet channel and inlet water passage are covered with a partition; and the outlet system is also provided with a partition that forms a conduit so that the water from the tank is directed into the outlet passage.

Positioned at the bottom of the tank and sealed therefrom is a lighting fixture which allows the tank to be illuminated so that the fish can be seen in the dark, thus to effect improved schooling and calming of the live bait fish after their transfer to the live bait tank.

OBJECTS AND ADVANTAGES OF THE INVENTION

The present invention has for an important object a bait tank comprising a cylindrical tank having water entering the tank compartment at an angular displacement, whereby the incoming water will be circulated in a continuous swirling movement and discharge to a drain, thus to prevent stagnation, permit aeration, and allow change of water at all levels.

It is another object of the invention to provide a bait tank of this type that includes a gate-valve arrangement to control the height of the water stored therein to accommodate various numbers of live fish.

It is further another object of the invention to provide a live bait tank for fishermen wherein a continuous flow of water is arranged to pass through the tank-storage compartment; and wherein the inlet water passage and outlet water passage are located outside the storage tank, so as to prevent obstructions within the tank compartment.

It is a further object of the present invention to provide a bait tank of this character that is simple and rugged in construction.

A still further object of the invention is to provide a device of this character that includes relatively few operating parts, and is easy to service and maintain.

It is still another object of the invention to provide a live bait tank that includes all of the above qualities, and is still relatively inexpensive to manufacture.

The characteristics and advantages of the invention are further sufficiently referred to in connection with the accompanying drawings, which represent at least two embodiments. After considering these examples, skilled persons will understand that variations may be made without departing from the principles disclosed and I contemplate the employment of any structures, arrangements or modes of operation that are properly within the scope of the appended claims.

DESCRIPTION OF THE DRAWINGS

Referring more particularly to the accompanying drawings, which are for illustrative purposes only:

FIG. 1 is a perspective view of the bait tank showing the tank as it would be placed on the floor or deck of a ship for use for sportfishing;

FIG. 2 is a top-plan view thereof;

FIG. 3 is an enlarged, cross-sectional view taken substantially along line 3—3 of FIG. 2;

FIG. 4 is a cross-sectional view taken along line 4—4 of FIG. 3;

FIG. 5 is an enlarged, cross-sectional view taken along line 5—5 of FIG. 4;

FIG. 6 is also an enlarged, cross-sectional view taken along line 6—6 of FIG. 4, showing the arrangement of the drain gate;

FIG. 7 is an exploded perspective view of the storage tank and its related inlet and outlet elements thereof;

FIG. 8 is an enlarged cross-sectional view taken substantially along line 8—8 of FIG. 7, with the inlet elements assembled;

FIG. 9 is a fragmentary sectional view showing a modified form of the drain compartment; and FIG. 10 is a cross-sectional view taken along line 10—10 of FIG. 9.

DESCRIPTION OF THE PREFERRED EMBODIMENT

Referring more particularly to FIGS. 1 through 6 and 8, there is shown a live fish bait tank, generally indicated at 10, wherein this type of unit is used aboard boats or ships involved in deep-sea or fresh water fishing. The bait tank comprises an inner storage tank, designated at 12, seen in FIG. 3, having a continuous circular wall 14 and a bottom wall 16, with the upper end being open at 18 and formed with an extending peripheral flange member 20.

An outer cover housing 22 is positioned over said storage tank 12, said housing being affixed to said tank in a suitable manner. That is, housing 22 is secured to the extended flange member 20 and is bonded thereto in any well known manner. The housing comprises, preferably, a four-sided wall structure 24 constructed of fiberglass which is finished with smooth surfaces, identical to the finish of said tank 12. Thus, housing 22 is defined as a rectangular cover member having an opening 26 formed in the upper end to correlate with opening 18 of said tank 12.

Accordingly, when cover housing 22 is secured over tank 12, there is established an annular compartment 28 disposed between walls 24 of said housing and the annular wall 14 of said storage tank 12. Because of the rectangular configuration of housing 22 and the circular configuration of tank 12, there is provided corner sections 30 wherein an inlet system is arranged in one section and an outlet system is arranged in an oppositely disposed section. With this arrangement, a continuous flow of water can be provided within and through the fish storage chamber 32 defined by annular wall 14.

Said inlet system, indicated generally at 34, comprises a vertical channel 36 having preferably a "V"-shaped cross-section, as seen in FIG. 8. Thus, each wall 37 and 38 of said vertical channel is angularly displaced with respect to the continuous annular wall thereof. Hence, water flow enters through a plurality of openings or holes 40 disposed in wall 38, thereby causing said water to follow a circular flow about chamber 32 substantially parallel to annular wall 14. To prevent water from entering into compartment 28, there is included a partition 42 having a semi-circular configuration and secured to said tank wall 14, so as to encapsulate inlet channel 36, the partition terminating at its upper end against flange member 20, and at its lower end sealed to a bottom plate 44. Said plate 44 can be integrally formed to partition 42 having a hole 45 forming a water inlet means, wherein suitable piping 46, as seen in FIG. 3, can be readily installed whereby water is pumped under pressure into inlet chamber 50 defined by partition 42, and from there into storage chamber 32.

In order to complete the continuous flow cycle, the oppositely disposed outlet system comprises a plurality of apertures 52 formed in annular wall 14. These apertures can be of any suitable configuration. That is, it can be seen in FIGS. 3 and 4 that apertures are formed as vertically elongated slots extending from a point just below the opening 18 to terminate just above bottom wall 16. However, a plurality of holes can be also used, with a sufficient number thereof to allow for a continuous flow therethrough if some holes become plugged.

A means for controlling the height of water within said tank is provided and comprises an adjustable gate valve 54 slidably positioned above a baffle partition 55, which is arranged in a fixed position relative to said apertures 52. The gate valve 54 and baffle 55 are supported in frame 56, wherein baffle 55 is secured thereto and gate valve 54 is mounted in grooves 58 formed in said frame, to allow for vertical adjustment of gate valve 54.

Thus, if a lower amount of water is required in chamber 32, gate valve 54 is arranged upwardly from baffle 55, as seen in FIG. 3, wherein opening 60 is created, thus allowing the water to only reach level 62.

However, if a larger volume of water is required, the gate valve 54 is lowered, thus closing opening 60, whereupon the level will raise to that shown at 64. In order to move valve 54, there is provided a knob 65 attached to valve 54, and an access passage 66 is located in upper wall 67 of the housing 22 and flange 20 of the tank, the passage 66 being adapted to receive removable cap 68.

As the water discharges from storage chamber 32, it flows into outlet chamber 70 formed by a semicircular partition 72 similar to partition 42, and secured to said tank in a suitable manner. From chamber 70, water flows through an outlet means comprising pipe 74 positioned in the bottom thereof.

It should be understood that water can be pumped through from pipe 46, and drained through pipe 74 having an open-loop system or a closed-loop system, wherein pipe 74 is connected to a pump (not shown) for continuous recirculation of the water therein.

Juxtapositioned below said outlet means is a drain means, generally indicated at 75, which comprises an enlarged opening 76, whereby not only discharge of water is allowed, but debris and small fish can be cleaned from chamber 32 when drain gate 78 is raised. In larger tank units, drain gate 78 is provided with a lever arm 80 secured to gate 78, and extends upwardly adjacent passage 66, whereby gate 78 can be opened or closed thereby, said gate being slidably mounted to wall 14 adjacent bottom wall 16.

It should be noted that an illuminating means is also provided in such a manner as to light up the storage chamber under certain lighting conditions (as an example, during night-time fishing to calm the bait fish, induce schooling of the fish in one direction, and to provide for convenient and ready viewing of the bait fish). The means shown in FIG. 3 comprises a central translucent dome member 82 arranged to receive any suitable light fixture 84.

MODIFIED EMBODIMENT

Referring now to a modified embodiment which is illustrated in FIGS. 7 through 10, there is shown a storage tank 12a, wherein the basic elements thereof correspond to previously described elements of the preferred embodiment, i.e., like elements having like reference numerals.

Said tank 12a includes inlet channel 36 having a plurality of inlet openings or holes 40 encapsulated on the outer side by partition 42 defining inlet chamber 50, whereby water flow will enter through opening 45, as heretofore described.

It is contemplated that this unit will be a smaller unit than the preferred embodiment; and thus the outlet system is arranged having apertures 52, shown as a plurality of openings or holes disposed oppositely to channel 36. Affixed to the outer surface of wall 14 is a stationary baffle plate 90, which covers apertures 52 and is spaced therefrom, as seen in FIGS. 9 and 10. The baffle plate is positioned to regulate the height of the water level in chamber 32. Thus, the lower end is provided with a bottom wall 92 to prevent water from discharging from that end, whereby the water must flow over baffle 90 at its upper open end 94 in order to discharge into chamber outlet 70 defined by sealed partition 72, as previously described.

This embodiment needs only a drain gate similar to that shown in FIGS. 3 and 6. However, in the smaller mode arm 80 is not required.

It should be also noted that both embodiments include a means for preventing the water in chamber 32 from being splashed out of opening 26 of the housing 22. This is accomplished by forming an inwardly depending lip member 95 about peripheral opening 26, thereby creating a buffer zone 96 between lip 95 and wall 14 of the tank.

The invention and its attendant advantages will be understood from the foregoing description, and it will be apparent that various changes may be made in the form, construction and arrangement of parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims.

The inventors claim:

1. A live fish bait tank comprising:
   an inner storage tank having a continuous cylindrical wall defining a storage chamber, the upper end thereof defining an access opening,
   a cover housing adapted to be positioned over said inner storage tank,
   means formed on said cover housing and positioned within said access opening of said storage tank, to prevent water stored therein from escaping therefrom,
   means defining an inlet passage adjacent to said cylindrical wall of said tank and within said cover housing, said wall defining at least one opening communicating between the passage and the storage chamber for passage of water therethrough into said storage chamber,
   an outlet system connected to said cylindrical wall and spaced from said inlet system, and
   means for providing drainage of said water from said storage chamber, whereby said tank can be emptied.

2. A live fish bait tank as recited in claim 1, wherein said outlet system comprises:
   a plurality of apertures formed in said cylindrical wall and oppositely disposed to said inlet channel;
   a partition affixed to said cylindrical wall defining an outlet chamber, said apertures being disposed to allow communication between said storage chamber and said outlet chamber;
   means within said outlet chamber to regulate the height of water provided in said storage chamber; and
   a water-outlet passage communicating with said outlet chamber to allow a continuous flow of water from said storage chamber to be discharged through said outlet chamber.

3. A live fish bait tank as recited in claim 2, wherein: said inlet channel is formed having walls angularly displaced to that of said cylindrical wall, and wherein said plurality of openings in one of said walls directs said water passing therethrough in a circular flow within said storage chamber.

4. A live fish bait tank as recited in claim 3, wherein: said walls of said inlet channel form a "V"-shaped configuration.

5. A live fish bait tank as recited in claim 3, wherein means within said outlet chamber to regulate the height of water in said storage chamber comprises:
   a frame member secured to said cylindrical wall adjacent said apertures therein;
   a baffle partition fixed within said frame member having a predetermined height to establish a low-level storage of said water in said storage chamber;
   a gate valve adjustably positioned above said baffle partition and slidably mounted to said frame member, whereby said gate valve can be positioned to provide an upper level storage of said water within said storage chamber.

6. A live fish bait tank as recited in claim 5, wherein:
   said cover housing includes an access opening adjacent said gate valve and said discharge means.

7. A live fish bait tank as recited in claim 6, wherein said drainage means comprises:
   an enlarged opening located below said outlet aperture and adjacent the bottom of said storage chamber; and
   a drain gate slidably mounted to said cylindrical wall to allow said enlarged opening to be opened or closed.

8. A live fish bait tank as recited in claim 7, wherein:
   said drainage means includes an actuating means connected to said drain gate and arranged to be accessible through said access opening of said housing cover.

9. A live fish bait tank as recited in claim 5, wherein said illuminating means comprises:
   a translucent dome formed in the bottom of said storage tank; and
   a light fixture mounted within said dome.

10. A live fish bait tank as recited in claim 9, wherein:
    said means to prevent water from escaping from said access opening of said storage tank comprises a continuous downwardly depending lip member integrally formed with said cover housing and extending into said access opening, whereby a buffer zone is defined between said lip and said wall of said tank.

11. A bait tank according to claim 1, wherein:
    said passage defining means comprises a partition secured to the exterior of the storage tank wall about the openings and cooperating with the storage tank wall to define said inlet passage.

12. A bait tank according to claim 1, wherein said inlet passage defining means comprises:
    an inclined portion of the storage tank wall defining opening means to direct incoming water flow in a direction generally parallel to the storage tank wall, and
    partition means cooperating with the storage tank wall to define said inlet passage.

13. A bait tank according to claim 1, wherein said inlet passage defining means comprises:
    a vertical channel defined in the storage tank wall and having a wall portion angularly inclined to the main tank wall and defining a plurality of spaced openings, to direct incoming water flow in a direction generally parallel to the storage tank wall, and
    partition means cooperating with the storage tank wall to define said inlet passage.

14. A bait tank according to claim 12, wherein:
    said partition means comprises a vertical partition secured to the exterior of the storage tank wall about the inclined wall portion and cooperating with the storage tank wall to define said inlet passages.

15. A bait tank according to claim 13, wherein: said partition means comprises a vertical partition secured to the exterior of the storage tank wall about the inclined wall portion and cooperating with the storage tank wall to define said inlet passages.

* * * * *